(12) United States Patent
Hintermeister et al.

(10) Patent No.: US 10,908,897 B2
(45) Date of Patent: Feb. 2, 2021

(54) DISTRIBUTING SERVICES TO CLIENT SYSTEMS TO DEVELOP IN A SHARED DEVELOPMENT ENVIRONMENT

(71) Applicant: INTERNATIONAL BUSINESS MACHINES CORPORATION, Armonk, NY (US)

(72) Inventors: Gregory R. Hintermeister, Rochester, MN (US); John W. Alcorn, Youngsville, NC (US); Eric N. Herness, Byron, MN (US); David Currie, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/202,003

(22) Filed: Nov. 27, 2018

(65) Prior Publication Data
US 2020/0167157 A1 May 28, 2020

(51) Int. Cl.
| | |
|---|---|
| G06F 9/44 | (2018.01) |
| G06F 8/77 | (2018.01) |
| G06F 21/62 | (2013.01) |
| H04L 29/06 | (2006.01) |
| G06F 9/54 | (2006.01) |
| G06F 8/61 | (2018.01) |

(52) U.S. Cl.
CPC .................. *G06F 8/77* (2013.01); *G06F 8/63* (2013.01); *G06F 9/547* (2013.01); *G06F 21/6254* (2013.01); *H04L 63/08* (2013.01)

(58) Field of Classification Search
CPC ... G06F 8/63; G06F 8/77; G06F 9/547; G06F 21/6254; H04L 63/08

USPC .................................................. 717/101–103
See application file for complete search history.

(56) References Cited

U.S. PATENT DOCUMENTS 7,788,122 B2 * 8/2010 Greenstein ......... G06Q 10/0631
705/7.26
8,683,430 B2 * 3/2014 Gonzales .................. G06F 8/71
717/109

(Continued)

OTHER PUBLICATIONS

Anonymous, "Deployable Development Environments Using PaaS and Micro-Clouds", IP.Com No. IPCOMM000243779D, IP.com Electronic Publication Date: Oct. 16, 2015, 6 pp.

(Continued)

*Primary Examiner* — Ted T. Vo
(74) *Attorney, Agent, or Firm* — Konrad Raynes Davda & Victor LLP; David W. Victor

(57) ABSTRACT

Provided are a computer program product, system, and method for distributing services to client systems to develop in a shared development environment. A first service is deployed to the first client system to develop the first service. A second service is deployed to the second client system to develop the second service. A call is received from the first service, executing in the first client system as part of development of the first service, to the second service. A determination is made as to whether the second service is deployed at the second client system and available in response to the call from the first service. A response is generated to the call to the second service from a component in the shared development environment in response to determining that the second service is deployed at the second client system and not available.

17 Claims, 6 Drawing Sheets

(56) References Cited

U.S. PATENT DOCUMENTS

| | | | |
|---|---|---|---|
| 9,137,106 B2 | 9/2015 | McCarthy et al. | |
| 9,614,730 B2* | 4/2017 | Boshev | H04L 67/10 |
| 10,348,718 B2* | 7/2019 | Thakkar | H04L 63/104 |
| 2005/0186625 A1* | 8/2005 | Heeb | G06F 8/443 |
| | | | 435/6.12 |
| 2013/0326487 A1 | 12/2013 | Yousouf et al. | |
| 2018/0285242 A1* | 10/2018 | Aasheim | G06F 11/3664 |

OTHER PUBLICATIONS

The Kubenetes Authors, "Documentation", [online] © 2018, [Retrieved on Oct. 21, 2018], Retrieved from the Internet at <URL: https://kubernetes.io/docs/>, 295 pp.

Microsoft, "Deploy and Access Development Environments", [online], [Retrieved on Oct. 22, 2018], Retrieved from the Internet at <URL: https://docs.microsoft.com/en-us/dynamics365/unified-operations/dev-itpro/dev-tools/access-instances>, 29 pp.

Nguyen, B.M., et al., "Development and Deployment of Cloud Services Via Abstraction Layer", 2013 International Conference on Computing, Management and Telecommunications, IEEE, 2013, 6 pp.

Pfeiffer, M., "Create a Cloud Development Environment for On-Premises Apps", [online], Jun. 3, 2016, [Retrieved on Oct. 22, 2018], Retrieved from the Internet at <URL: https://searchitoperations.techtarget.com/tip/Create-a-cloud-development . . . >, 3 pp.

Telepresence, "Discussion", [online], [Retrieved on Oct. 20, 2018], Retrieved from the Internet at <URL: https://www.telepresence.io/discussion/>, 3 pp.

Vecchiola, C., et al., "Aneka: A Software Platform for .NET-based Cloud Computing", High Speed and Large Scale Scientific Computing 18, 2009, 30 pp.

Wikipedia, "Kubernetes", [online], Last Edited Oct. 12, 2018, [Retrieved on Oct. 21, 2018], Retrieved from the Internet at <URL: https://en.wikipedia.org/wiki/Kubernetes>, 7 pp.

* cited by examiner

DISTRIBUTING SERVICES TO CLIENT SYSTEMS TO DEVELOP IN A SHARED DEVELOPMENT ENVIRONMENT

BACKGROUND OF THE INVENTION

1. Field of the Invention

The present invention relates to a computer program product, system, and method for distributing services to client systems to develop in a shared development environment.

2. Description of the Related Art

Cloud environments allow enterprises to offload certain operations to cloud computing centers to share resources and to provide scalable computing for enterprise needs. Software developers may deploy programs being developed in a shared cloud development environment to allow for the development of programs in a shared cloud environment. User accounts may allow access via a remote desktop environment to allow developers to access the cloud development environment to develop programs. Companies may run development and test environments of programs in the public cloud. Cloud providers provide software development tools to allow for program development, testing and compiling in the cloud. Code may be deployed in the code and then numerous tests may be performed against the application in the cloud to ensure it is ready to release for production.

There is a need in the art for improved techniques for developing programs and code in a shared development environment.

SUMMARY

Provided are a computer program product, system, and method for distributing services to client systems to develop in a shared development environment. A first service is deployed to the first client system to develop the first service. A second service is deployed to the second client system to develop the second service. A call is received from the first service, executing in the first client system as part of development of the first service, to the second service. A determination is made as to whether the second service is deployed at the second client system and available in response to the call from the first service. A response is generated to the call to the second service from a component in the shared development environment in response to determining that the second service is deployed at the second client system and not available.

DETAILED DESCRIPTION

Program developers may be hesitant to deploy programs being developed into a shared cloud environment due to security concerns and because of the difficulty in managing shared changes and coordinating access in a team development environment. Described embodiments provide improvements to computer technology for implementing a shared development environment to maintain security and development at local clients, while allowing testing of the services at the local clients by allowing calls to services to be forwarded to local clients when the services are available at the local clients. However, if a service deployed at a local client for development is unavailable, such as the service is offline because it is currently being updated or compiled, then a response to a call to a service from another service being developed at another client may be generated from a component in the shared development environment. This component may comprise saved default data to be provided when the service is unavailable or a location of a previous version of the service in the share development environment that may be called.

Further, with described embodiments, security is maintained by providing users at client systems that are authenticated an installation image of credentials, resources and a service to be developed at the client system. The provided credentials allow the service being developed to call other services and access resources through the shared development environment in a secure manner.

Figure 1:
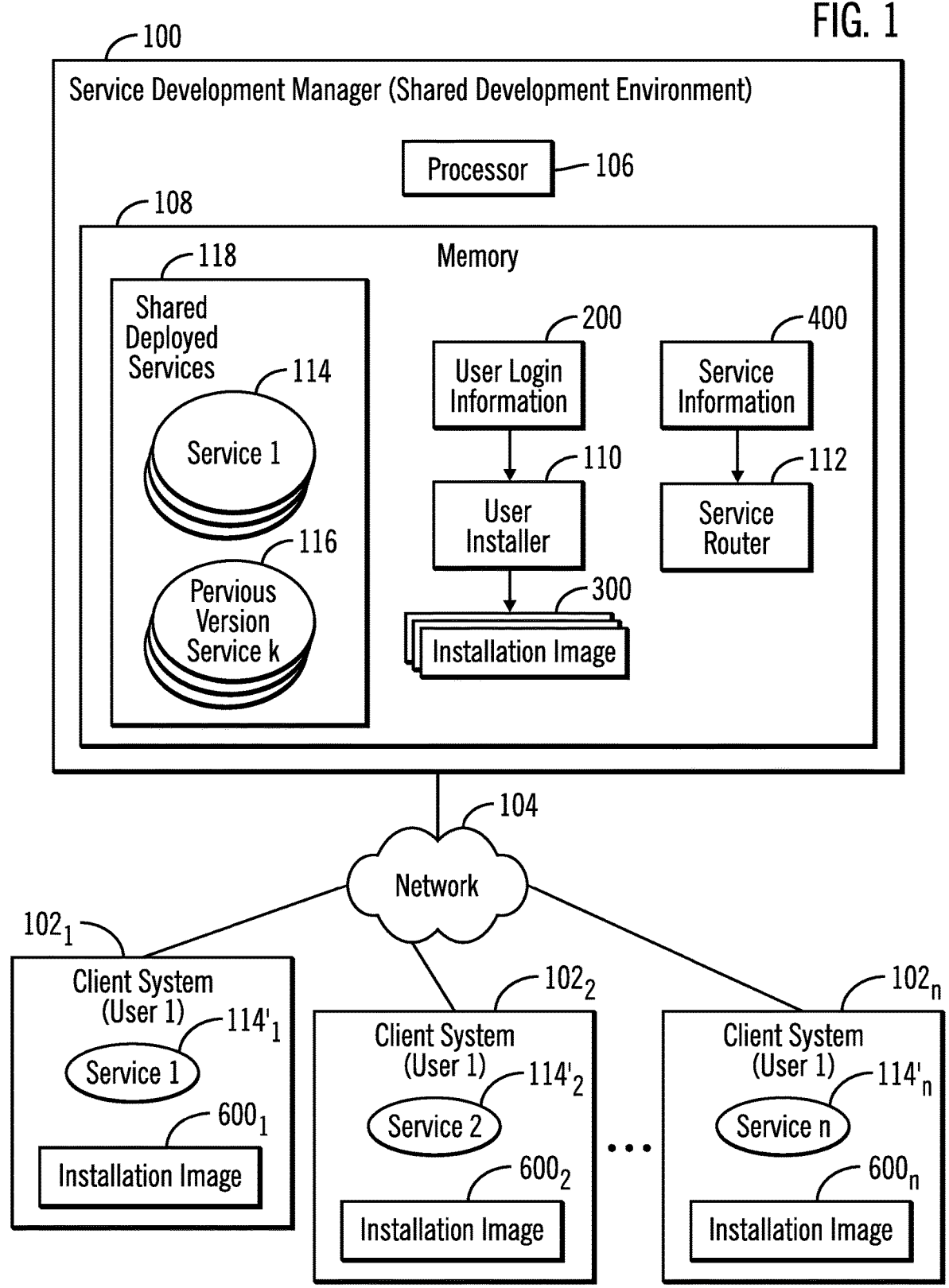
FIG. 1 illustrates an embodiment of a shared development environment.

FIG. 1 illustrates an embodiment of a program development computing environment having a service development manager 100 implementing a shared development environment that communicates with a plurality of client systems $102_1$, $102_2$ . . . $102_n$ over a network 104. The service development manager 100 has a processor 106 comprising one or more processor cores that execute programs loaded in a memory 108, including a user installer 110, a service router 112, services 114, and previous versions of services 116, referred to as shared deployed services 118 for shared use by users having credentials to access the service. The user installer 110 processes user login information 200 to generate an installation image $300_i$ for a user to execute at a client system $102_i$ and deploy a service $114_i$ at the client system $102_i$ as service $114'_i$ for the client system $102_i$ to develop, update, compile and test. Services 114, $114'_i$, and 116 comprise computer code implementing a software functionality or a set of software functionalities, such as the retrieval of specified information or execution of a set of operations, with a purpose that different clients and users can reuse for different purposes, together with the policies that should control its usage (based on the identity of the user/client requesting the service). The services may be part of a package of dependent services.

The service router 112 receives calls to services 114 and uses service information 400, having current information on a status and location of the services 114, to determine a location of the requested service to which to forward the call. The arrows shown in FIG. 1 for elements 200 to 110, 110 to 300, and 400 to 112 illustrate a flow of data to and from the program elements 110, 112.

The installation images 300 execute at the client system $102_1, 102_2 \ldots 102_n$ to provide access to resources and other services 114 in the shared development environment 100. At the client systems $102_1, 102_2 \ldots 102_n$, the users may update, code, debug, and test the services $114'_1, 114'_2 \ldots 114'_n$ to provide an updated service to return to the shared development environment 100 to deploy as a deployed service 118. Further, an updated service $114'_1, 114'_2 \ldots 114'_n$ at a client system $102_1, 102_2 \ldots 102_n$ may then be tested by allowing the service $114'_1, 114'_2 \ldots 114'_n$ at the client system $102_1, 102_2 \ldots 102_n$ to process calls to the service test how the updated service performs.

The network 104 may comprise a network such as a Storage Area Network (SAN), Local Area Network (LAN), Intranet, the Internet, Wide Area Network (WAN), peer-to-peer network, wireless network, arbitrated loop network, etc.

The memory 108 may comprise a suitable volatile or non-volatile memory for storing programs to execute and information 200, 400 used by the programs 110, 112 to execute.

The programs 112, 112 may comprise program code loaded into memory and executed by a processor. Alternatively, some or all of the functions may be implemented in hardware devices, such as in Application Specific Integrated Circuits (ASICs) or executed by separate dedicated processors.

Although a certain number of instances of elements, such as shared development manager 100, client systems $102_i$, and services 114, $114'_i$, 116, etc., are shown, there may be any number of these elements.

Figure 2:
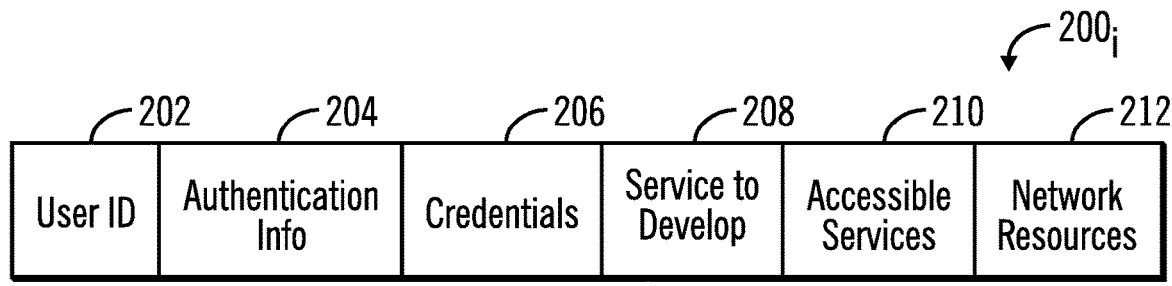
FIG. 2 illustrates an embodiment of user information for users in the shared development environment.

FIG. 2 illustrates an embodiment of an instance of user information $200_i$ in the user login information 200 for a user i to participate in the development of services 114, and includes: a user identifier (ID) 202 identifying the user; authentication information 204 to authenticate the user 202 to access the shared development environment 100; credentials 206 for the user 202 to access services 114 and other resources in the shared development environment 100; a service to develop 208 indicating a service 114 assigned to the user 202 to develop and update; accessible services 210 comprising services in the shared development environment 100 the user 202 has credentials 206 to access; and network resources 212 to allow a client system $102_i$ to connect to the shared development environment 100, such as settings for a virtual private network (VPN) to tunnel into the service development manager 100.

In further embodiments, a user information $200_i$ instance may comprise a pointer to a location where the information is stored in the shared development environment 100. Further, the user ID 202 and authentication information 204 may comprise an access token.

Figure 3:
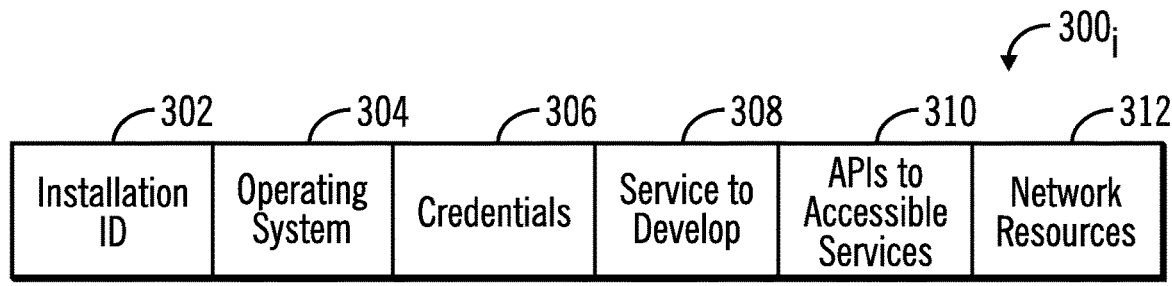
FIG. 3 illustrates an embodiment of an installation image for client system to provide the components a user needs to develop services in the shared development environment.

FIG. 3 illustrates an embodiment of an instance of an installation image $300_i$ to deploy to a client system $102_i$ generated by the user installer 110, and includes: an installation ID 302; an operating system 304, including network and other drivers; credentials 306 to use to access services 114 and resources in the shared development environment 100; a service to develop 308, comprising service $114'_i$ indicated in field 208; Application Programming Interfaces (APIs) to accessible services in the shared development environment 100, as indicated in accessible services 210; and network resources 312 from the network resources 212 used by the client system $102_i$ to access the shared computing environment 100. The installation image $300_i$ may further include software development tools and other programs to allow an authorized user at the client system $102_i$ to develop, update, code, debug, compile, and test the service 308, $114'_i$ sent to the client system $102_i$.

In one embodiment, the installation image $300_i$ may comprise a binary executable image or a virtual machine to deploy at the client systems $102_i$. In alternative embodiments, the installation image $300_i$ may not include an operating system, but include configuration settings and credentials to access services and resources in the shared development environment 100.

Figure 4:
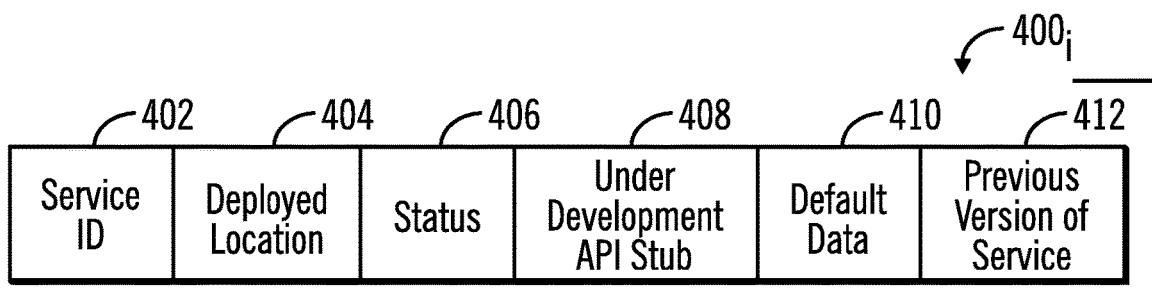
FIG. 4 illustrates an embodiment of service information having information on a service being developed.
Figure 4:
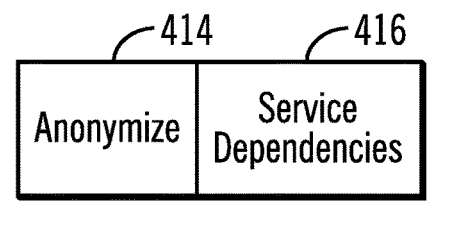

FIG. 4 illustrates an embodiment of an instance of service information 400 for a service $114_i$, and includes: a service identifier (ID) 402; a deployed location 404, such as in the shared deployed services 118 or at a client system $102_i$; a status 406, such as online or offline; an under development API stub 408 if provided indicating that default data 410 is to be returned in response to a call to the service 402 from a client system $102_j$ while the client system $102_i$ to which the service 402 is deployed is offline, such as when a user at the client system $102_i$ is coding, debugging or compiling the service 402; a previous version of the service 412 that when indicated may be called in the shared computing environment 100 in lieu of the current version of the service $114'_i$ being developed at the client system $102_i$; an anonymize field 414 indicating to redact personally identifiable information (PII) or other sensitive information from any returned data from the called service 402; and service dependencies 416 of other services $114_j$ in a dependency relationship with the service 402, where a dependency relationship means that at least one of the services in the dependency relationship calls at least one other service in the dependency relationship.

Figure 5:
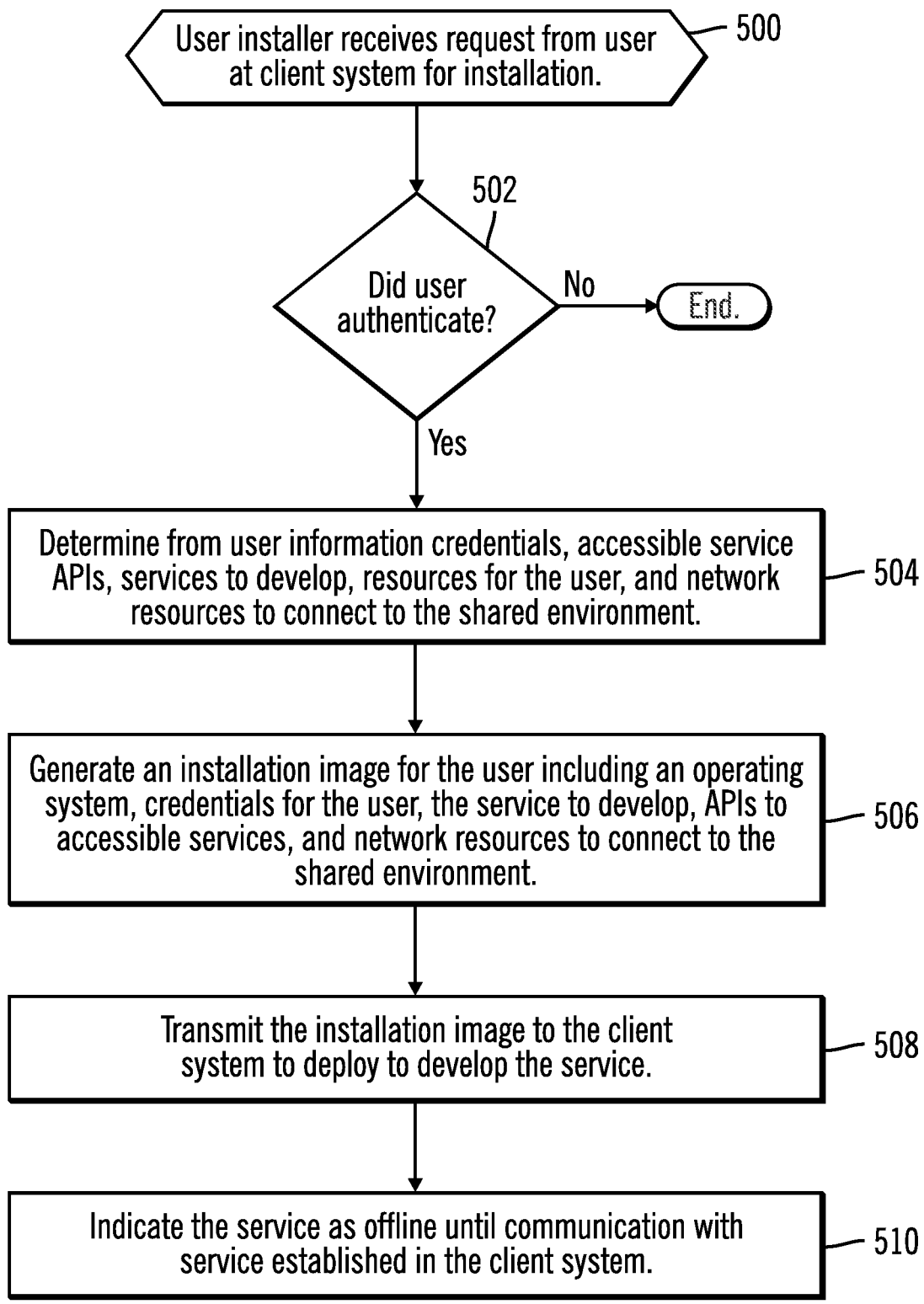
FIG. 5 illustrates an embodiment of operations to process a request from a user at a client system for an installation image.

FIG. 5 illustrates an embodiment of operations performed by the user installer 110 in response to receiving a request from a user at a client system $102_i$ for an installation image 300 to use to develop a service $114'_i$. Upon receiving (at block 500) a request from a user i at a client system $102_i$, the user installer 110 determines (at block 502) whether the user i is authenticated, such as with the user authentication information 204. If the user i is not authenticated, then control ends. Otherwise, if the user i is authenticated, then the user installer 110 determines (at block 504) from user information $200_i$ for the user i, credentials 206, a service to develop 208, resources for the user, accessible service APIs 210, and network resources 212. The user installer 110 generates (at block 506) an installation image $300_i$ for the user including: an operating system 304; credentials 306, comprising credentials 206; the service to develop 308, comprising the service 208; APIs to accessible services 310 from the services 210; and network resources 312, such as indicated in field 212 of the user information $200_i$. The installation image $300_i$ may further include an operating system 304 and other software development tools to develop the service 308. The installation image $300_i$ may also include access to other resources in the shared development environment 100. The installation image $300_i$ may comprise a binary image or virtual machine (VM) that may be installed and executed at the client system $102_i$.

The user installer 110 transmits (at block 508) the installation image $300_i$ to the client system $102_i$ over the network 104 to deploy for developing the service 308. The service 308 is indicated (at block 510) in the service information $400_i$ as deployed at the client system $102_i$ and having an offline status 406. The status 406 may be updated to online when the user installer 110 or other program detects the service 114'$_i$ deployed on the client system 102$_i$ as online.

With the embodiment of FIG. 5, installation images 300$_i$ are generated for authenticated users to deploy at client systems 102$_i$ operated by the users to allow the users to develop assigned services 114. This provides improved computer technology for distributing services to the developers by distributing the services to develop with a computing environment to deploy at the user client system to provide access to APIs and other tools needed to develop and test the service 114'$_i$. The embodiment of FIG. 5 provides security in authenticating a clients installed image and the credentials the executing image needs to access resources in the shared development environment 100.

Figure 6:
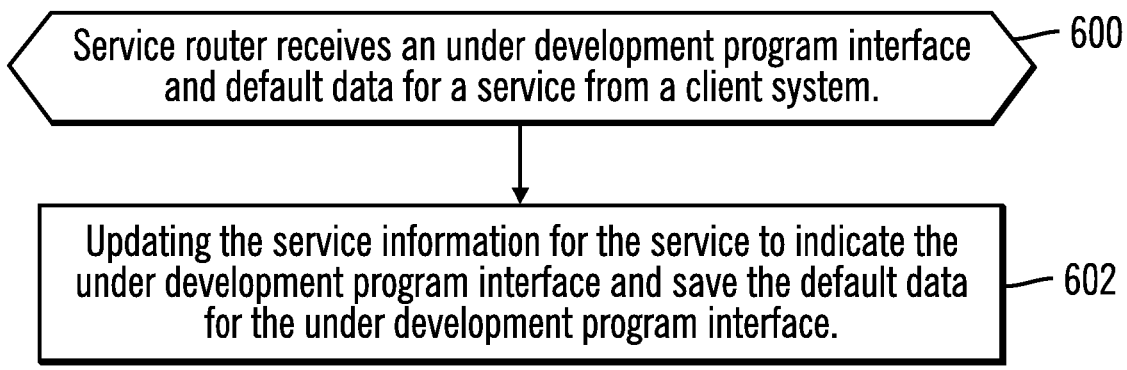
FIG. 6 illustrates an embodiment of operations to process an under development program interface and default data for a service deployed at a client system to develop.

FIG. 6 illustrates an embodiment of operations performed by the service router 112 upon receiving an under development program interface for a service and default data from a client system 102$_i$ at which an installation image 300$_i$ is running to develop the service 114'$_i$. Upon receiving (at block 600) the under development program interface and default data to return to a call to the service 114'$_i$ from another client system 102$_j$ at which another service 114'$_j$ is being developed and tested, the service router 112, or other component, updates (at block 602) the service information 400$_i$ for the service 114$_i$ being developed to indicate the under development program interface in field 408, such as a stub file, and save the default data for the under development program interface to default data 410. The under development program interface may comprise an API stub file that indicates to return the default data to any service calling the API service for which the API stub file is developed.

With the embodiment of FIG. 6, the user at the client system 102$_i$ provides default data to the service router 112 to return to a calling service 114$_j$ when the called service 114 is located at the client system 104$_i$ and unavailable, such as if the client system 102$_i$ or service 114'$_i$ being developed is offline, such as for coding, testing, and compiling. The user at the client system 102$_i$ may provide instances of default data 410 to return while the service is offline and not accessible.

In an alternative embodiment, the user i at the client system 102$_i$ may request a previous version 116 be called while the service to develop 114'$_i$ is offline or not available.

Figure 7:
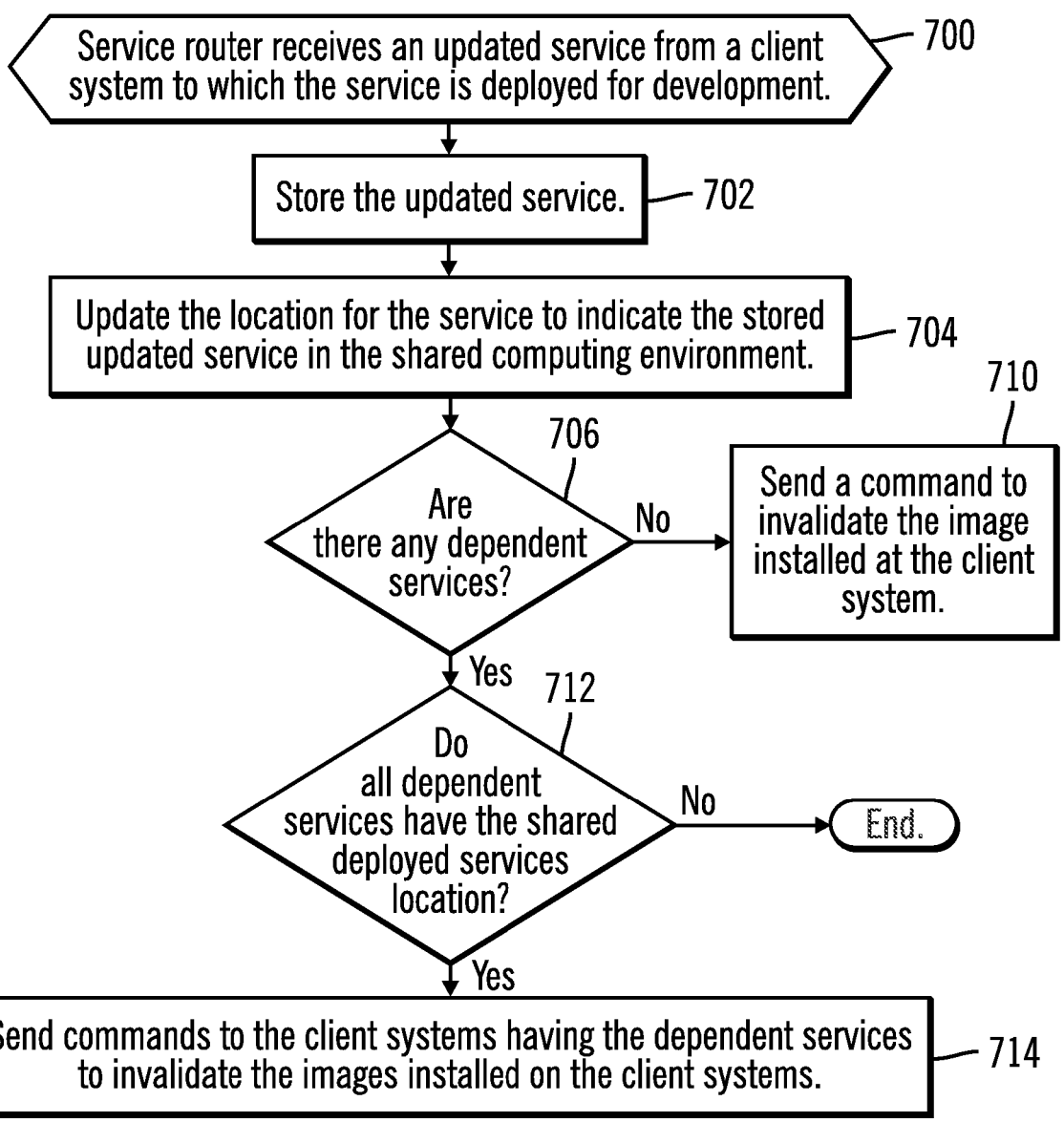
FIG. 7 illustrates an embodiment of operations to process an updated service from a client system for a service deployed at the client system to develop and test.

FIG. 7 illustrates an embodiment of operations performed by the service router 112 upon receiving an updated service 114'$_i$ from a client system 102$_i$ to which the service 114$_i$ is deployed for development. Upon receiving (at block 700) the updated service 114'$_i$, the updated service 114'$_i$ is stored (at block 702), such as in the shared deployed services 118. The location for the service is updated (at block 704) in the deployed location 404 to indicate the location of the updated service in the shared deployed services 118 in the shared computing environment 100. If (at block 706) there are no dependent services in the service dependencies field 416, then the service router 112 sends (at block 710) a command to the client system 102$_i$ to invalidate the installation image 300$_i$ installed and deployed at the client system 102$_i$.

If (at block 706) there are dependent services 416, then a determination is made (at block 712) as to whether all dependent services 416 indicate the shared development environment location 404, which means they were updated and deployed at the service development manager 100. If all dependent services 416 were deployed back to the shared development environment 100, then the service router 112 sends (at block 714) commands to the client systems 102$_i$ having the dependent services 114'$_i$ to invalidate the installation images 300$_i$ because development of the dependent services has completed. If (at block 712) all the dependent services have not been completed and deployed back, then control ends to wait for all dependent services to be updated and available in the shared development environment 100 before invalidating the deployed installations 300$i$.

With the embodiment of FIG. 7, when a service is completed and deployed back to the shared development environment 100, then the installation image 300$_i$ or multiple installation images 300$_i$ at client systems 100, at which the image is deployed are invalidated as the service and all its dependent components have been completed and deployed.

Figure 8:
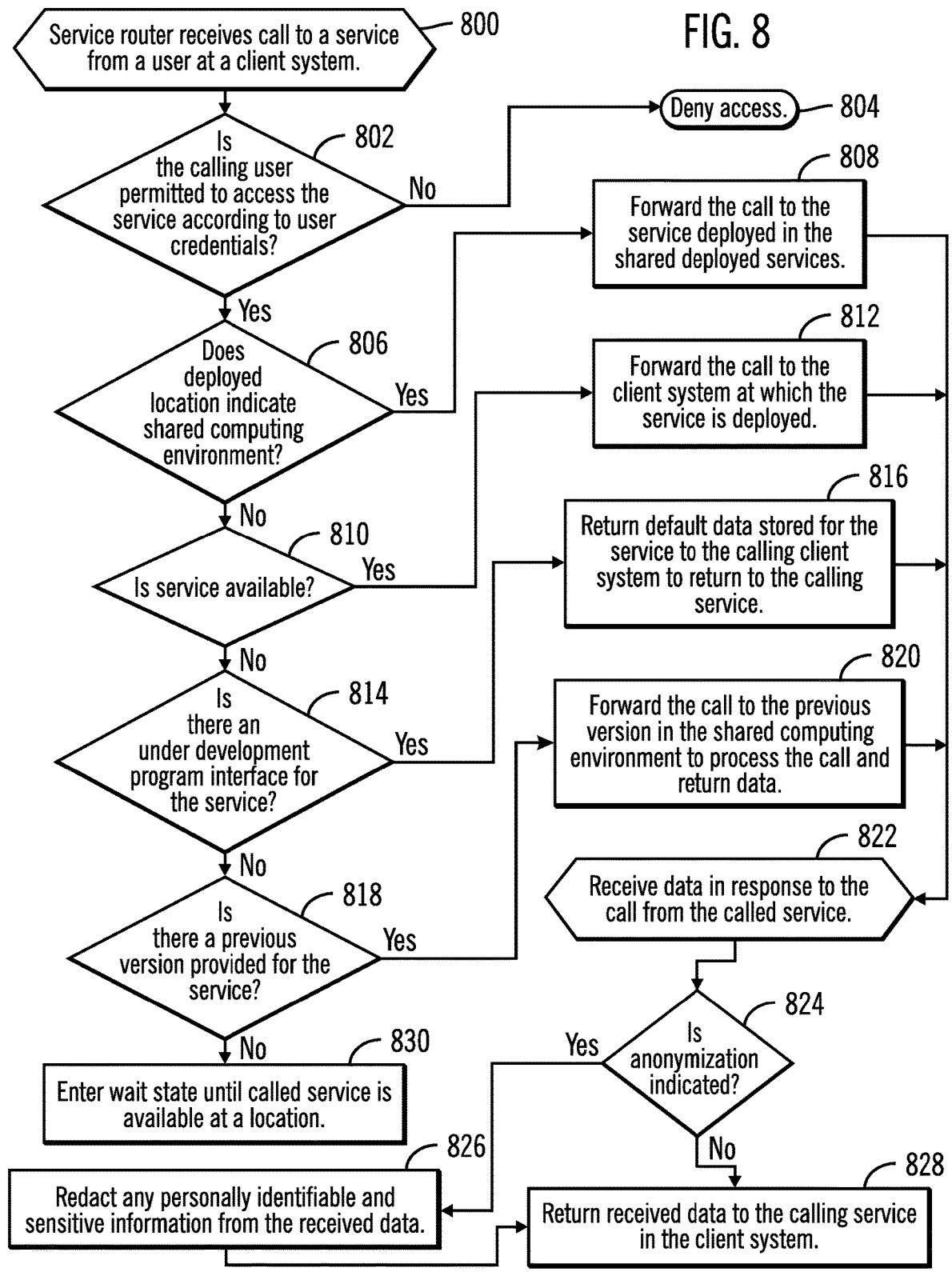
FIG. 8 illustrates an embodiment of operations to route a call to a service to a deployed location at which the service is currently located in the development environment.

FIG. 8 illustrates an embodiment of operations performed by the service router 112 to process a call to a service 114$_i$ from another service 114$_j$ deployed in client system 102$_j$. Upon receiving (at block 800) the call, if (at block 802) the calling user j at the client system 102$_j$ is not permitted to access the called service 114$_j$ according to the user information 200$_j$ credentials 206 for the user j, then control ends with access to the called service 114$_j$ being denied. If (at block 802) the user j is permitted access and if (at block 806) the deployed location 404 for the called service 114$_i$ indicates the shared development environment 100, then the service router 112 forwards (at block 808) the call to the service 114$_j$ in the shared deployed services 118 in the shared development environment 100 to execute. If (at block 806) the deployed location is not in the shared development environment 100, but instead at a client system 102$_i$, then if (at block 810) the called service 114$_j$ is available, as indicated in field 406, then the service router 112 forwards (at block 812) the call to the client system 102$_j$ at which the called service 114$_j$ is deployed over the network 104.

If (at block 810) the service 114$_j$ is not available, such as if the status 406 in the service information 400$_j$ indicates offline, then if (at block 818) there is an under development program interface indicated in field 408 for the service 114$_j$, then the service router 112 returns default data 410 stored for the service 114$_j$. If (at block 814) no under development program interface is indicated in field 408, but (at block 818) a previous version of the service 412 is indicated in the service information 400$_j$, then the call is forwarded (at block 820) to the previous version 116$_j$ in the shared development environment 100 indicated in field 412.

Upon receiving (at block 822) data returned in response to the call from block 808, 812, 816 or 820, if (at block 824) the anonymize field 414 indicates that the data is to be anonymized, then the service router 112 redacts (at block 826) any personally identifiable and sensitive information from the returned data. If (at block 824) the anonymize field 414 does not indicate to anonymize the returned data or after the data is anonymized (at block 826), the service router 112 returns (at block 828) the received data to the calling service 114$_j$ in the client system 102$_j$ of the network 104. If (at block 818) there is no previous version of the service, e.g., not indicated in field 412, or default data to return, e.g., not indicated in fields 408, 410, when the called service 114$_j$ is located on the client system 102$_j$, e.g., as indicated in deployed location 404, and not available, e.g., as indicated by an offline status 406, then a wait state may be entered (at block 830) until the called service is available, e.g., online, at the deployed location 404.

When forwarding a call or returning data at blocks 808, 812, 816, 820, the service router 112 may anonymize the data, such as redact any personally identifiable and sensitive information before forwarding the call.

With the embodiment of FIG. 8, a service router handles the processing of a call to a service 114$_j$ which may be deployed at a client system $102_j$ under development. The service router 112 will automatically determine different options for providing the requested data from the called service $114_j$, which may involve returning default data or executing a previous version if the service $114_j$ is offline and under development at the client system $102_j$, such as being debugged, updated or compiled. Further, if the service $114_j$ is available at the client system $102_j$, then the call is routed to the client system $102_j$ to have the service $114_j$ return the call for the purposes of testing how the service $114_j$ integrates with other services $114_i$ being developed in the code develop environment by multiple developers/users at different client systems concurrently developing the services for a product or group of related services. This allows for developers to have the code/service they are developing to be tested in real time in the operating environment by receiving and processing calls from dependent services $114_i$ also being developed in the development environment.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
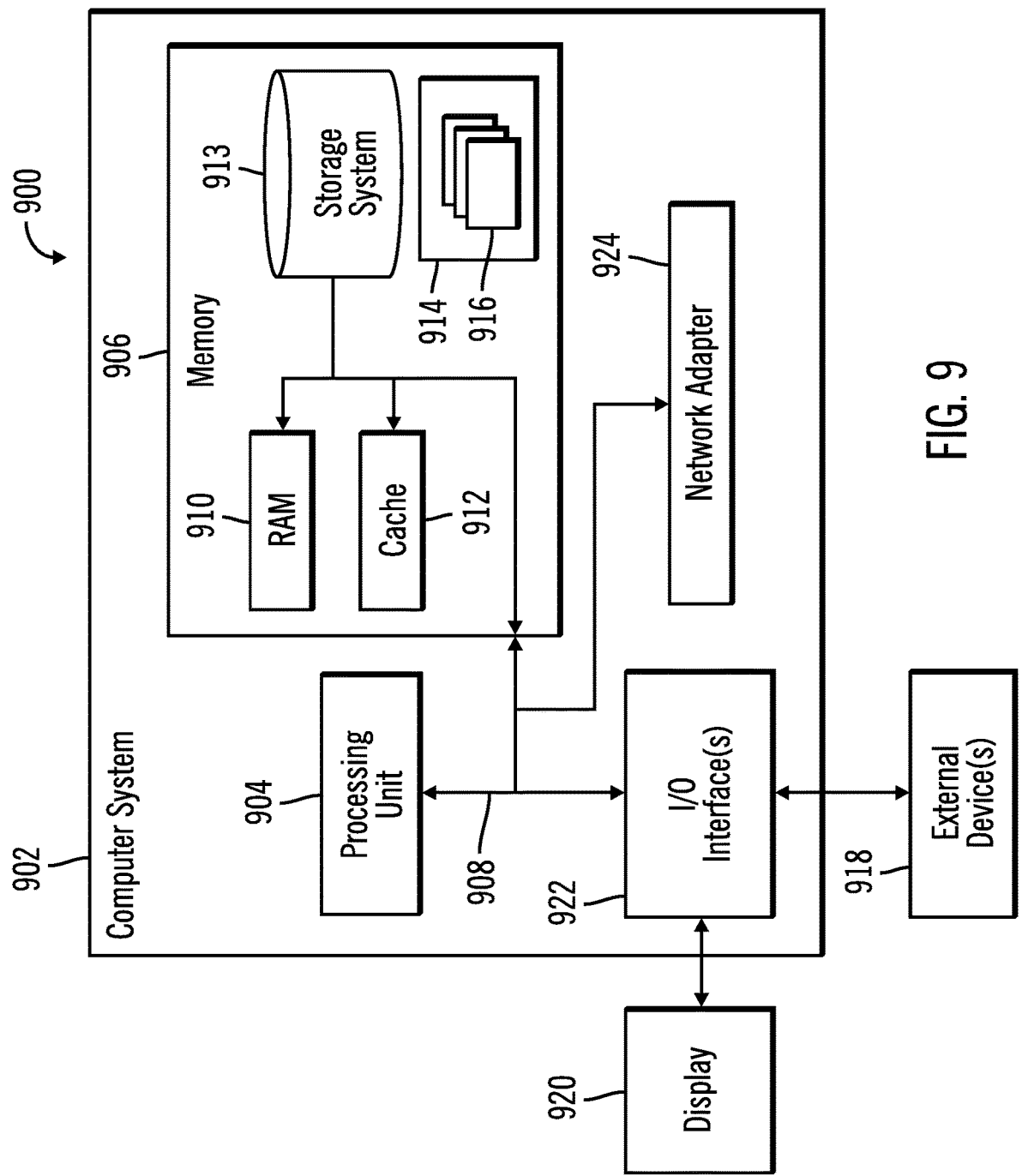
FIG. 9 depicts a computing environment in which the components of FIG. 1 may be implemented.

The computational components of FIG. 1, including the service development manager and the client systems $102_1$, $102_2 \ldots 102_n$ may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing development of services for a shared development environment for a first client system and a second client system, wherein the computer program product comprises a computer readable storage medium having computer readable program instructions executed by a processor to perform operations, the operations comprising:

maintaining information on credentials and resources in the shared development environment assigned to a first user and a second user and indication that the first user is assigned a first service and the second user is assigned a second service;

receiving a first login by the first user from the first client system;

generating a first installation image for the first user having credentials and resources in the shared development environment assigned to the first user and the first service to deploy on the first client system;

receiving a second login by the second user from the second client system;

generating a second installation image for the second user having credentials and resources in the shared development environment assigned to the second user and the second service to deploy on the second client system;

transmitting the first installation image to the first client system to deploy a first service to the first client system to develop the first service;

transmitting the second installation image to the second client system to deploy the second service to the second client system to develop the second service wherein the first service and the second service comprise computer code implementing software functionality, and wherein to develop the first and the second services comprises performing at least one of update, code, debug, and test the first and the second service, respectively;

receiving a call, from the first service executing in the first client system as part of development of the first service, to the second service;

determining whether the second service is deployed at the second client system and available in response to the call from the first service;

forwarding the call to the second service at the second client system in response to determining that the second service is deployed at the second client system and is available to be called; and generating a response to the call to the second service from a component in the shared development environment in response to determining that the second service is deployed at the second client system and not available.

2. The computer program product of claim 1, wherein the operations further comprise:

storing default data for the second service in the shared development environment, wherein the generating the response to the call to the second service from the component in the shared development environment comprises providing the default data to the first client system.

3. The computer program product of claim 1, wherein the operations further comprise:

indicating a location of a previous version of the second service in the shared development environment, wherein the generating the response to the call to the second service from the component in the shared development environment comprises forwarding the call to the previous version of the second service to process the call and return data to the first service.

4. The computer program product of claim 1, wherein the operations further comprise:

determining whether the second service is deployed in the shared development environment in response to the call from the first service; and routing the call to the second service deployed in the shared development environment in response to determining that the second service is deployed in the shared development environment.

5. The computer program product of claim 1, wherein the operations further comprise:

receiving an updated second service from the second client system and indication that the second client system completed development of the second service; and indicating that the second service is available in the shared development environment as the updated second service in response to receiving the updated second service from the second client system.

6. The computer program product of claim 1, wherein the operations further comprise:

routing the call to the second service deployed in the second client system in response to determining that the second service is deployed in the second client system and available.

7. The computer program product of claim 1, wherein the operations further comprise:

receiving data to return to the call to the second service;

processing the received data to remove personally identifiable information to produce anonymized data from the second service; and returning the anonymized data to the first client system.

8. The computer program product of claim 1, wherein the credentials and the resources included in the first installation image allow the first client system to access the second service and all additional services called by the first service, and wherein the credentials and the resources included in the second installation image allow the second client system to access all additional services called by the second service.

9. The computer program product of claim 1, wherein the operations further comprise:
receiving an updated first service from the first client system;
determining that the first service and the second service are in a dependency relationship in response to receiving the updated first service;
receiving an updated second service from the second client system; and
issuing a command to invalidate an installation of the first and the second services at the first and the second client systems in response to receiving the updated first and second services in the dependency relationship.

10. A system for providing a shared development environment to a first client system and a second client system, comprising:
a processor; and
a computer readable storage medium having computer readable program instructions executed by the processor to perform operations, the operations comprising:
maintaining information on credentials and resources in the shared development environment assigned to a first user and a second user and indication that the first user is assigned a first service and the second user is assigned a second service;
receiving a first login by the first user from the first client system;
generating a first installation image for the first user having credentials and resources in the shared development environment assigned to the first user and the first service to deploy on the first client system;
receiving a second login by the second user from the second client system;
generating a second installation image for the second user having credentials and resources in the shared development environment assigned to the second user and the second service to deploy on the second client system;
transmitting the first installation image to the first client system to deploy a first service to the first client system to develop the first service;
transmitting the second installation image to the second client system to deploy the second service to the second client system to develop the second service, wherein the first service and the second service comprise computer code implementing software functionality, and wherein to develop the first and the second services comprises performing at least one of update, code, debug, and test the first and the second service, respectively;
receiving a call, from the first service executing in the first client system as part of development of the first service, to the second service;
determining whether the second service is deployed at the second client system and available in response to the call from the first service;
forwarding the call to the second service at the second client system in response to determining that the second service is deployed at the second client system and is available to be called; and
generating a response to the call to the second service from a component in the shared development environment in response to determining that the second service is deployed at the second client system and not available.

11. The system of claim 10, wherein the operations further comprise:
storing default data for the second service in the shared development environment, wherein the generating the response to the call to the second service from the component in the shared development environment comprises providing the default data to the first client system.

12. The system of claim 10, wherein the operations further comprise:
indicating a location of a previous version of the second service in the shared development environment, wherein the generating the response to the call to the second service from the component in the shared development environment comprises forwarding the call to the previous version of the second service to process the call and return data to the first service.

13. The system of claim 10, wherein the operations further comprise:
routing the call to the second service deployed in the second client system in response to determining that the second service is deployed in the second client system and available.

14. A method for managing development of services for a shared development environment as performed by a processor executing computer program code to perform operations, comprising:
maintaining information on credentials and resources in the shared development environment assigned to a first user and a second user and indication that the first user is assigned a first service and the second user is assigned a second service;
receiving a first login by the first user from a first client system;
generating a first installation image for the first user having credentials and resources in the shared development environment assigned to the first user and the first service to deploy on the first client system;
receiving a second login by the second user from a second client system;
generating a second installation image for the second user having credentials and resources in the shared development environment assigned to the second user and the second service to deploy on the second client system;
transmitting the first installation image to the first client system to deploy a first service to a first client system to develop the first service;
transmitting the second installation image to the second client system to deploy the second service to a second client system to develop the second service, wherein the first service and the second service comprise computer code implementing software functionality, and wherein to develop the first and the second services comprises performing at least one of update, code, debug, and test the first and the second service, respectively;
receiving a call, from the first service executing in the first client system as part of development of the first service, to the second service;
determining whether the second service is deployed at the second client system and available in response to the call from the first service;
forwarding the call to the second service at the second client system in response to determining that the second client system is deployed at the second client system and is available to be called; and generating a response to the call to the second service from a component in the shared development environment in response to determining that the second service is deployed at the second client system and not available.

15. The method of claim 14, further comprising:

storing default data for the second service in the shared development environment, wherein the generating the response to the call to the second service from the component in the shared development environment comprises providing the default data to the first client system.

16. The method of claim 14, further comprising:

indicating a location of a previous version of the second service in the shared development environment, wherein the generating the response to the call to the second service from the component in the shared development environment comprises forwarding the call to the previous version of the second service to process the call and return data to the first service.

17. The method of claim 14, further comprising:

routing the call to the second service deployed in the second client system in response to determining that the second service is deployed in the second client system and available.

* * * * *